United States Patent [19]
Authier

[11] Patent Number: 5,381,312
[45] Date of Patent: Jan. 10, 1995

[54] AIRCRAFT ILLUMINATION DEVICE

[76] Inventor: Ricky J. Authier, 11304 110th Ave. E., Puyallup, Wash. 98374

[21] Appl. No.: 101,936

[22] Filed: Aug. 4, 1993

[51] Int. Cl.6 .............................................. B64D 47/02
[52] U.S. Cl. ....................................... 362/62; 362/34; 362/191; 340/946; 340/982
[58] Field of Search ........................... 362/34, 62, 191; 244/17.11, 17.17; 340/946, 982

[56] References Cited

U.S. PATENT DOCUMENTS

| | | | |
|---|---|---|---|
| 3,710,311 | 1/1973 | Avital | 362/62 X |
| 3,819,925 | 6/1974 | Richter et al. | 240/2.25 |
| 4,768,136 | 8/1988 | Tashjian | 362/34 X |
| 4,916,581 | 4/1990 | Authier | 362/34 |

Primary Examiner—Stephen F. Husar
Attorney, Agent, or Firm—David P. Campbell

[57] ABSTRACT

A system for illuminating parts of an aircraft, such as a helicopter, including three low-intensity position lights (10) mounted on the aircraft, with two of the position lights mounted in a forward location and spaced laterally from the center of the aircraft and a third position light mounted in an aft location centrally positioned on the aircraft. The three position lights provide a triangular light formation that indicates the position of the aircraft during tactical, covert operations. The position lights include a chemiluminescent light source (12) and a housing (22) for carrying the chemiluminescent light source. Each housing is secured to a part of the aircraft by means of a bracket (52) and a pair of band clamps (60). The chemiluminescent light source is visible from within the housing within a limited range of the aircraft. Preferably, the chemiluminescent light source creates an infrared light that is detectable by means of night vision goggles worn by pilots of nearby flying aircraft.

12 Claims, 4 Drawing Sheets

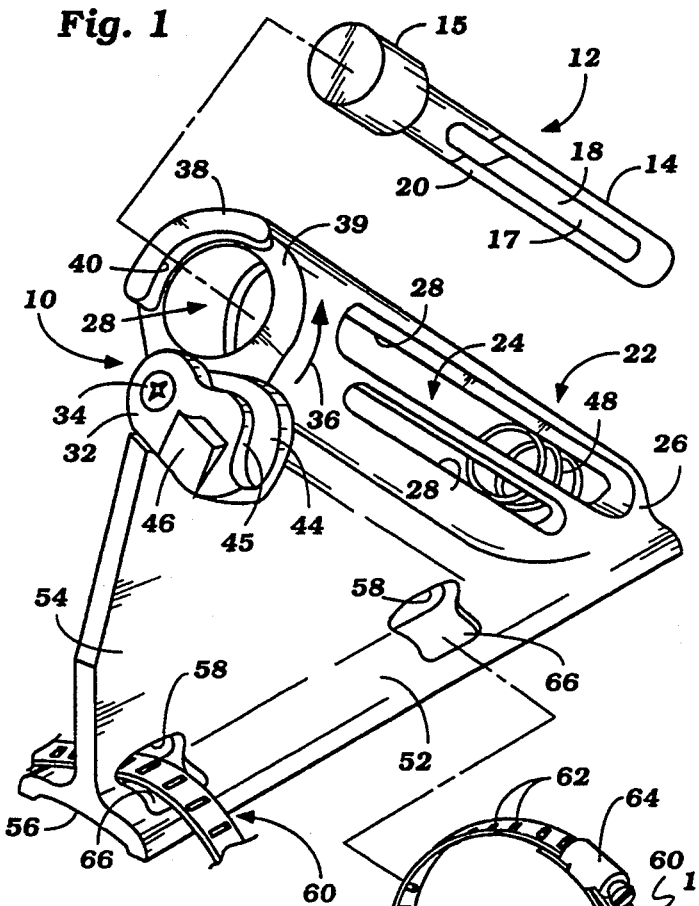
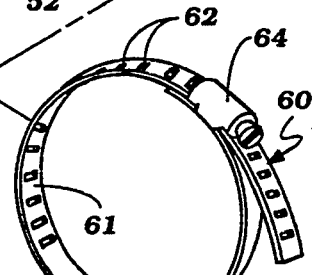
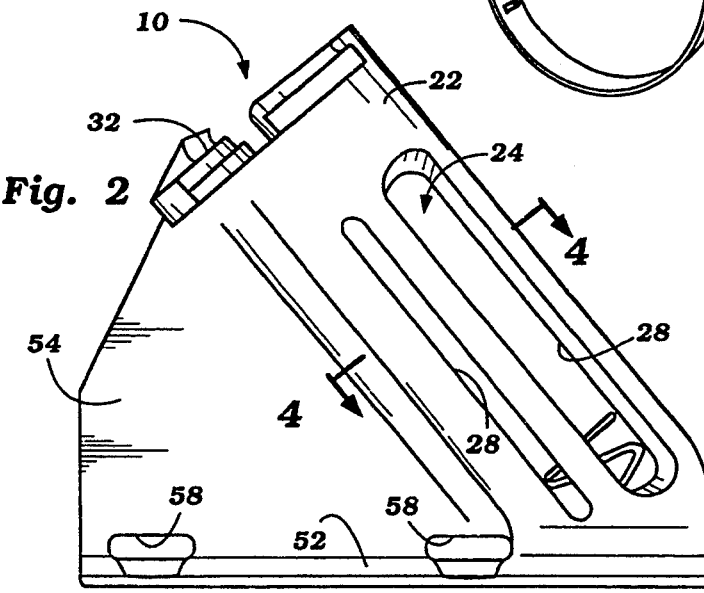
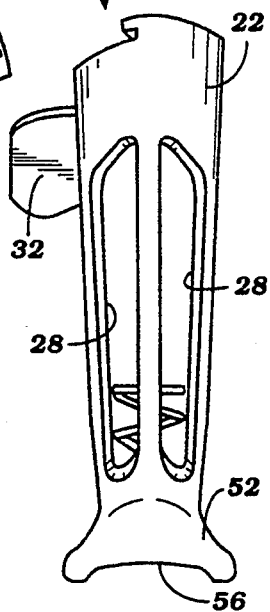
Fig. 1
Fig. 2
Fig. 3

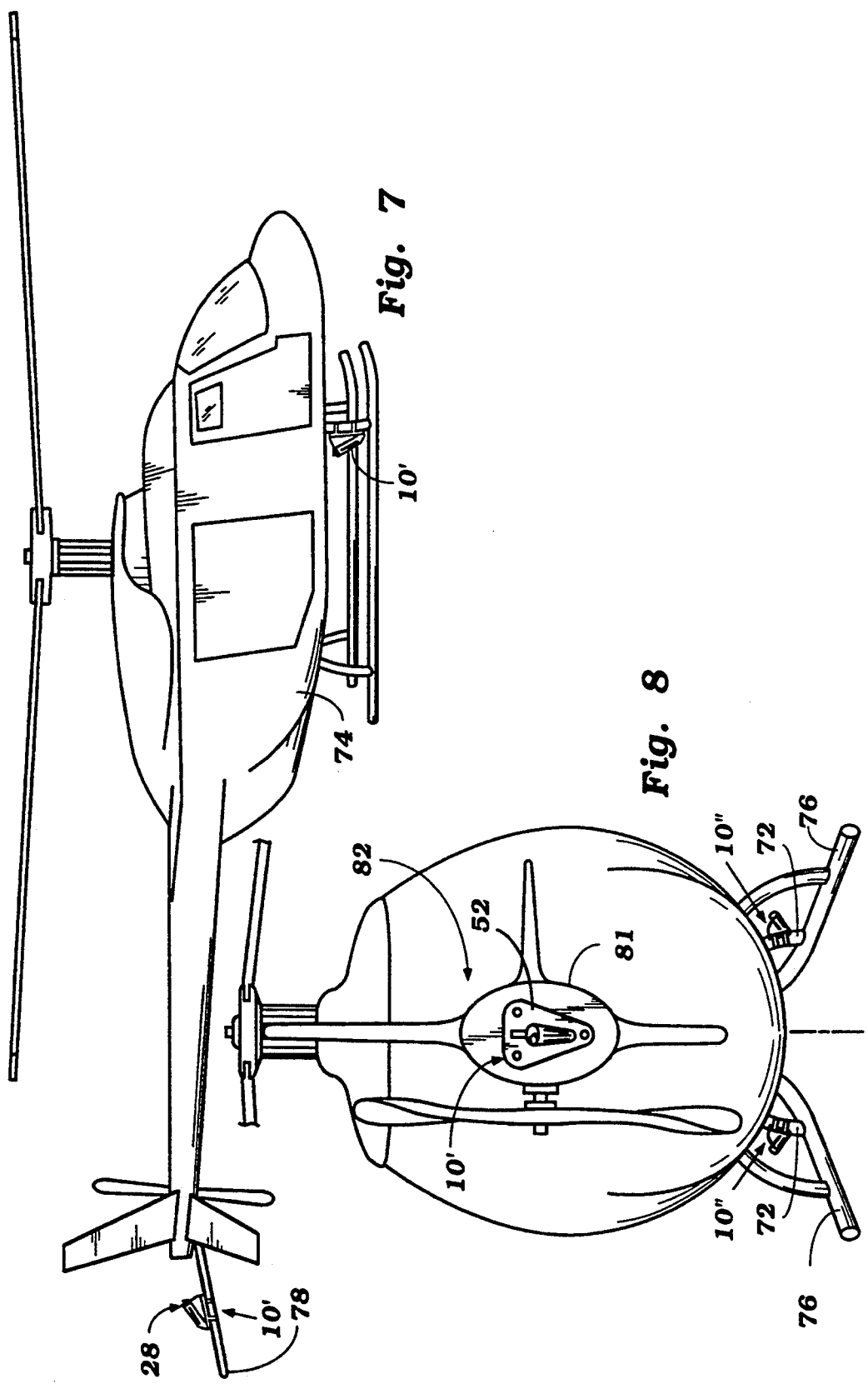

AIRCRAFT ILLUMINATION DEVICE

TECHNICAL FIELD

This invention relates to aircraft position lights and, more particularly, to low-intensity, anti-collision or collision avoidance lights that are mounted directly to aircraft and/or helicopters for indicating position of the aircraft during tactical, covert, night-flying operations.

BACKGROUND OF THE INVENTION

Tactical, covert, nighttime combat and training flying missions are routinely conducted by military forces. In these operations, aircraft, particularly helicopters, fly in close formation along the contour of the landscape in order to avoid enemy radar, as well as to avoid early visual detection. Such operations are known as "ground-skimming" or "nap-of-the-earth" flights.

It is extremely difficult for pilots to see other aircraft flying in formation during covert, night-flying missions. Typically, these missions are conducted either at night or at dawn or dusk where natural lighting is at a minimum. In addition, since the purpose of such missions is to avoid detection, the aircraft fly with their navigation lights turned off. Further, the aircraft are usually painted with highly light-absorbent paint to make it even more difficult to see the aircraft at night. As a result, the risk of aircraft collisions is greatly increased.

To enhance the ability of pilots to see other aircraft in low-level light conditions, night vision goggles (NVG's), originally used by the army and infantry, were developed for military aviation. Generally, these goggles use tiny sensors to amplify electronically ambient light up to 100,000 times. Green images of night landscapes are displayed on two tiny video screens embedded in binocular-like goggles suspended from a pilot's helmet. Sophisticated infrared NVG's can provide images not only at night, but also in inclement weather.

However, due to the limitations in technology of NVG's, such goggles have not eliminated the risk of aircraft collisions. For example, military pilots mistakenly attempting to land on other aircraft is a common type of accident. Many problems associated with NVG's are due to the single-color lighting, limited field of view, and depth perception limitations of the goggles. *Army Times* reported in its Mar. 6, 1989 issue that between 1978 and 1989, 50 U.S. Army aircraft were involved in accidents where goggles were worn. These accidents cost the Army more than $114.6 million in lost aircraft and injuries. To this date, aircraft collisions are a constant concern for the military during such covert nighttime operations.

My earlier U.S. Pat. No. 4,916,581 discloses a device for illuminating the ends of a helicopter rotor blade by attachment of a chemiluminescent light stick to the rotor blade's tip. The chemiluminescent light provides an indication to the pilot of the helicopter of the position of the rotor blade's outer perimeter. However, such a system does not provide an indication to other pilots of the position and heading of the fuselage of the helicopter. Close formation flying operations require that pilots know the position of other aircraft and the direction or heading of the aircraft, which information allows pilots to track closely behind other aircraft in formation. With this information, pilots can swiftly and efficiently perform nap-of-the-earth flying missions.

Hard-wired, electric non-candescent position light systems are cost prohibitive. The installation of such a system would cost many thousand dollars per aircraft. Furthermore, such a system would require constant inspection to ensure its operability, would require regular replacement of defective bulbs or other hardware, and would be subject to unexpected failure during use.

The Army has attempted to use a tape-over system for covert, nighttime, training missions. The navigational lights, which are the red, green, and white lights on the aircraft, are taped over with a translucent tape so that a low-intensity light is given off. While such a system works satisfactorily in providing a low-intensity light, it is not entirely practical to use and sometimes is used in contravention of FAA regulations regarding aircraft lighting. When aircraft are required to fly through civilian airspace prior to or during training missions, the tape-over method cannot be used due to the FAA regulations regarding navigation lights. The aircraft must land when flying into civilian air space so that the tape can be removed and when flying out of civilian air space into military airspace so that the tape can be added. This delays the training mission and sometimes is not practical for lack of a suitable landing site.

Accordingly, a heretofore unaddressed need exists for a practical and cost-effective, low intensity anti-collision aircraft illumination system for covert night-flying operations.

DISCLOSURE OF THE INVENTION

Briefly described, the present invention comprises a system for illuminating parts of an aircraft wherein the system includes two low-intensity position lights mounted in a forward location and spaced laterally from the center of the aircraft and a third low-intensity position light mounted in an aft location centrally positioned on the aircraft. The three position lights together provide a generally triangular light formation that indicates to other pilots the position of the aircraft during tactical, covert, night-flying operations.

Each low-intensity position light includes a chemiluminescent light source comprised of a chemiluminescent substance and a translucent container for encapsulating the chemiluminescent substance. A housing is provided for carrying the chemiluminescent light source. The housing includes a chamber for receiving the chemiluminescent light source, with the housing having an opening for inserting and removing the chemiluminescent light source into and from the chamber. The housing also includes at least one side opening for exposing the translucent container to the exterior of the housing. A bracket is included on the housing. The bracket is shaped to conform with the aircraft structure to which the bracket is to be mounted for securing the position light to the aircraft.

In preferred form, the housing also includes a closure member for closing off the end opening to the chamber after the chemiluminescent light source is inserted therein. A lock mechanism may be provided for securing the closure member in its closed position with the chemiluminescent light inserted into the housing chamber. The chemiluminescent light source may be of the type that produces either a low-intensity visible light, an infrared light, or an ultraviolet light.

The position lights are mounted onto the aircraft in a manner so that the translucent container of the chemiluminescent light source is exposed rearwardly and to the sides of the aircraft. With two position lights mounted forward on the aircraft and one position light mounted aft, a triangular light formation is created, which when viewed from the sides or rear, provides pilots of nearby aircraft an indication of the position of the fuselage of the aircraft. Generally, nearby aircraft flying in formation are located either to the rear or sides of the aircraft.

An infrared chemiluminescent light is picked up easily by night vision goggles, and low-intensity visible chemiluminescent light can be detected by pilots not wearing NVG's so long as the respective aircraft are within a limited range. The chemiluminescent light is visually detectable only from a distance much less than the audible range of the aircraft. Thus, for example, enemy forces cannot detect the chemiluminescent light and would tend to hear the rhythmic sounds of a helicopter's rotor blades prior to being able to see the chemiluminescent light.

The chemiluminescent light source is of the type that produces light when two chemical components come into contact with each other. To activate the chemiluminescent light, the container is bent until a glass ampule containing one of the components within the container breaks, causing the two components to mix. Upon activation, the chemiluminescent light source typically has a life greater than the fuel capacity of many types of aircraft. Thus, the chemiluminescent light source does not need replacing during flight.

In use, the three chemiluminescent light sources are activated and inserted into the chambers of the housings of the three position lights on an aircraft. During flight, the chemiluminescent light sources generate a low-intensity light that is easily detected from short range by night vision goggles. As stated, the chemiluminescent light sources produce light for at least as long as the flying time of the aircraft. Between flying missions, the translucent containers of the chemiluminescent light sources can be removed with new chemiluminescent light sources activated and installed in the position light housings immediately prior to subsequent missions.

It should be noted that the present invention can be utilized for many types of aircraft, although it is primarily directed for helicopter use. In addition, the use of the present invention is not limited to military operations. The chemiluminescent position lights can be used for civilian aircraft as, for example, in emergency rescue operations.

Other features and advantages of the present invention can be seen and understood by examination of the appended drawings, description of the best mode for carrying out the invention, and the claims, all of which are incorporated herein by reference as a portion of the disclosure of the present invention.

BRIEF DESCRIPTION OF THE DRAWINGS

Like reference numerals are used to indicate like parts throughout the various figures of the drawings, wherein:

FIG. 1 is an exploded isometric view of a position light of the present invention;

FIG. 2 is a side elevation view of the position light of FIG. 1;

FIG. 3 is an end elevation view of the position light of FIGS. 1 and 2;

FIG. 7 is a side elevation view of a helicopter with the aft-located position light mounted on the tail skid of the helicopter; and FIG. 8 is a rear elevation view of a helicopter with a modified aft-located position light mounted on the transmission box of the tail rotor.

BEST MODE FOR CARRYING OUT THE INVENTION

Figure 4A:
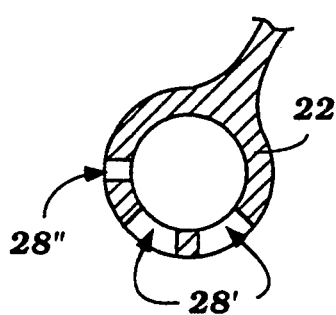
FIGS. 4A through 4C are cross-sectional views of the chemiluminescent light source housings of the position lights of the present invention, with FIG. 4A being taken along the line 4—4 of FIG. 2.

Referring now to the drawings, FIGS. 1-3 illustrate a low-intensity position light 10 that is adapted to be mounted at the front port side of an aircraft. The other position lights that are mounted at the front starboard side and at an aft position on the aircraft are generally similar to the position light shown in FIGS. 1-3, with minor variations that will be discussed later.

The position light 10 includes a chemiluminescent light source 12 (shown in FIG. 1, but not in FIGS. 2 and 3). The chemiluminescent light source 12 may be of the type disclosed in U.S. Pat. Nos. 3,539,794 and 3,597,362. By way of example, the chemiluminescent light source 12 includes an elongated, tubular, translucent container 14 that has an enlarged headed end 15. An elongated glass ampule 17 is carried within the translucent container 14. The glass ampule 17 contains a first chemical component 18, and the translucent container 14 contains a second chemical component 20. Such chemiluminescent light sources, which produce light when a chemical reaction takes place by two components coming into contact with each other, are well known in the art.

The chemiluminescent light source is packaged in a manner that permits the chemical components to remain inactive until it is desired to use the light source and then permits quick and easy activation. When it is desired to use the device, the translucent container 14 is pressed inwardly or bent at its midsection to cause the inner glass ampule 17 to rupture, causing the two components to mix and begin to illuminate or "glow." Hence, the device is simple and easy to operate. These devices are also available which emit non-candescent light (i.e., light in the non-visible spectrum), such as infrared or ultraviolet light.

The position light 10 also includes a housing 22 for holding or carrying the chemiluminescent light source 12. The housing includes an elongated cylindrical chamber 24 for receiving the translucent container 14. The cylindrical chamber 24 is closed at its lower end 26 and has an end opening 28 at its upper end. The translucent container 14 is insertible into the chamber 24 through the end opening 28.

The chamber 24 includes a set of side openings 28 that extend parallel to one another along a substantial portion of the length of the chamber 24. The housing 10 shown in FIGS. 1-3 has three side openings that are arranged in a manner discussed later with reference to FIGS. 4A-4C. The side openings 28 expose the translucent container 14 to the exterior of the housing 22.

The housing 22 includes a closure member 32 that is pivotally secured to the housing 22 by means of a screw 34. The closure member 32 is movable in the direction of arrow 36 from an open position, as shown in the figures, to a closed position wherein the end opening 28 of the chamber is closed off. In its closed position, the closure member 32 holds the translucent container 14 within the chamber 24.

A rim or flange 38 is provided along a portion of the edge 39 defining the end opening 28. The flange 38 includes a lip 40 that partially overhangs the edge 39. The closure member 32 includes a projection or flange 44 that is sized to be received beneath the lip 40 in abutment with the rim 38. The inner curved edge 45 of the closure member 32 is partially circular to conform and mate with the lip 40 when the closure member 32 is closed. A tab 46 is provided for assisting an operator in opening and closing the closure member 32.

A compression spring 48 is provided at the lower end 26 of the chamber 24. The compression spring 48 serves the purpose of ejecting the translucent container 14 upon opening of the closure member 32 and of securely holding the translucent container 14 within the housing 22 against the inner sidewall of the closure member 32 when the closure member is in its closed position. The force of the translucent container 14 against the inner sidewall of the closure member 32 creates a frictional engagement between the projection 44 of the closure member 32 and the lip 40 of the rim 38. This frictional engagement operates as a locking mechanism and prevents opening of the closure member inadvertently during flight.

A bracket 52 is mounted at the lower end of the housing 22. The bracket 52 and the housing 22 are angularly displaced from one another and reinforced by a gusset 54. The bracket 52 has a concave lower surface 56, as best seen in FIG. 3. The concave surface 56 is adapted to conform to a tubular structure to which the bracket is to be mounted on the aircraft. The gusset 54 includes a pair of openings or slots 58, each for receiving a band clamp 60. Clamps 60 are well known in the art and, generally, include a band 61 with a series of notches 62 therearound, and an adjustment mechanism 64 for tightening the band. The bracket 52 includes a smoothed recess portion 66 at the lateral edge of the bracket adjacent each opening 58. Recesses 66 provide a smooth surface for receiving the clamps 60.

FIG. 4A is a cross-sectional view of the housing 22 taken along the line 4—4 of FIG. 2. FIG. 4A illustrates the angular position of the side openings 28 in the housing 22. Two of the openings 28' are equivalent in size and are generally larger than opening 28". The arrangement of the openings 28 of each housing differentiates the three position lights from each other.

Figure 4B:
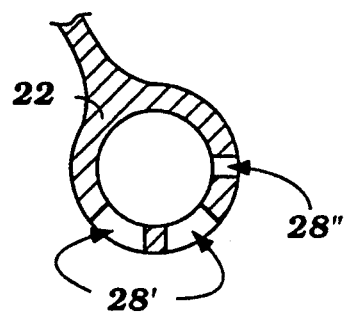

FIG. 4B illustrates a cross-sectional view of the position light mounted at the front starboard side of the aircraft. In the position light shown in FIG. 4B, the two large openings 28' are reversed with respect to the smaller opening 28" from the openings of the position light shown in FIG. 4A. Thus, with the position light shown in FIG. 4B mounted on the starboard side of the aircraft and the position light shown in FIG. 4A mounted on the port side of the aircraft, the two smaller openings 28" face generally outwardly of the aircraft. The larger openings 28' face both rearwardly of the aircraft and inwardly of the aircraft.

Figure 4C:
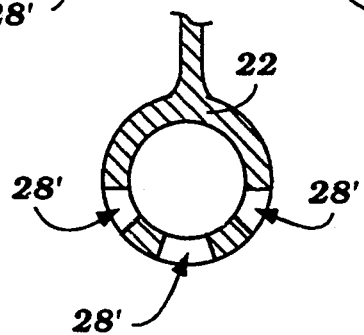

As shown in FIG. 4C, the housing 22 of the position light mounted at an aft location on the aircraft includes three larger openings 28'. The openings 28' of the housing 22 of the aft position light are equally spaced around the periphery of the housing.

The arrangement of the position lights shown in FIGS. 4A–C with respect to each other schematically shows how the position lights would be arranged on the aircraft. So arranged, the side openings of the position lights would illuminate light generally rearwardly and outwardly to the sides of the aircraft, but not in a forward direction where, for example, such light may be detected by enemy forces.

Figure 5:
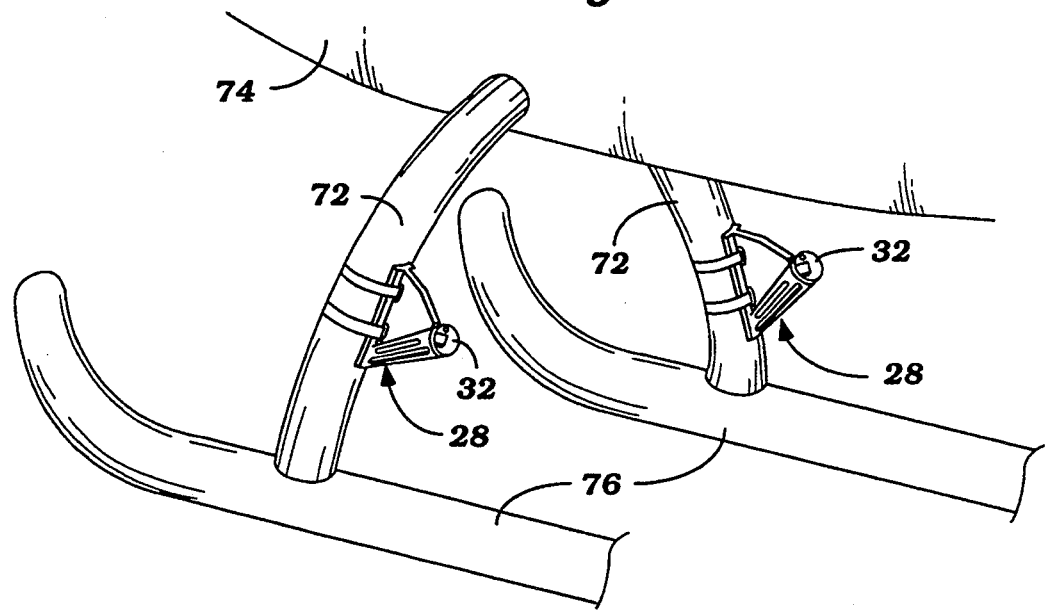
FIG. 5 is a fragmentary side view of the lower portion of a helicopter with two forwardly-located position lights mounted to the struts of the helicopter skids.
Figure 6:
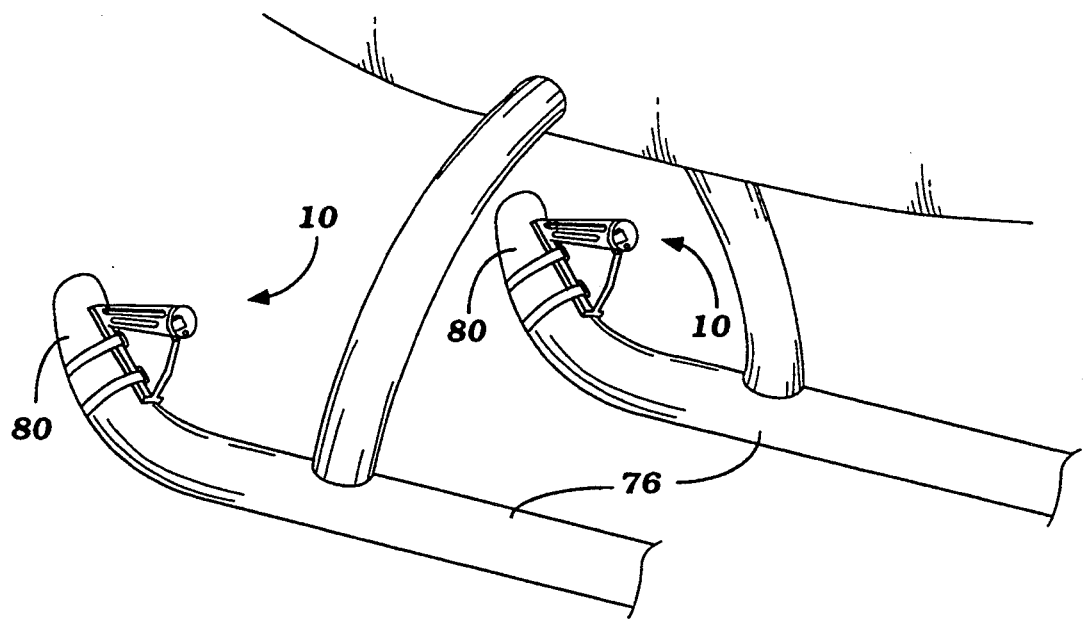
FIG. 6 is a fragmentary side view of a portion of a helicopter with the two forwardly-located position lights mounted on the front tips of the helicopter skids.

FIG. 5 illustrates a typical arrangement for mounting the two forwardly-mounted position lights. As shown in FIG. 5, the position lights are mounted to struts 72 between the fuselage 74 of a helicopter and the landing skids 76. In FIG. 5, the front of the helicopter is to the left of the figure. The side openings 28 of the position lights generally face rearwardly of the helicopter, which, as discussed above, is preferable for avoiding detection by enemy forces. The closure members 32 of the housings 22 face rearwardly to some extent so that airflow past the aircraft will not tend to push open the closure members. FIG. 6 illustrates an alternative location for mounting the front position lights 10. In FIG. 6, the position lights are mounted at the front tips 80 of the landing skids 76 of a helicopter. This arrangement is not preferred to the mounting arrangement shown in FIG. 5, but is shown as an alternative method should mounting the position lights to the struts be impractical. FIGS. 7 and 8 illustrate alternative locations for mounting the aft-located position light 10. In FIG. 7, the aft position light is denoted by reference numeral 10' and is mounted on a tail skid 78 that extends rearwardly from the fuselage 74 of the helicopter. The position light 10' is mounted to the tail skid 78 in a manner so that the side openings 28 of the position light are angled upwardly and face generally rearwardly of the helicopter.

In FIG. 8, the position light 10' is mounted on the transmission box 81 of the rear tail rotor 82. In this configuration, the bracket 52 of the position light is modified to conform to the dimensions of the back side of the transmission box 81. The bracket 52 is generally triangular in shape, but could be any shape necessary for mounting to the transmission box. The housing of the position light remains unchanged and the housing and bracket are still angled with respect to each other. The modified bracket is simply mounted onto the transmission box 80 with a set of bolts.

FIG. 8 also illustrates the triangular configuration of the position lights. The forwardly-located position lights, referenced as 10", are mounted to the front struts 72 and are spaced laterally from a longitudinal centerline 84 of the aircraft. The aft or rear position light is centrally positioned on the longitudinal centerline of the aircraft. The front position lights, together with the rear position light 10", form a triangular pattern. The light pattern is used by pilots of nearby aircraft to track the position of the helicopter. For example, the two forward position lights 10" indicate to other pilots the position of the front of the helicopter, and the rear position light 10' indicates the position of the tail assembly of the helicopter, which information provides other pilots the heading of the helicopter. The position of the front position lights 10" relative to the horizon indicate the roll of the helicopter, and the position of the front position lights relative to the rear position light and the horizon provides an indication of the pitch of the helicopter. With this information, pilots of other aircraft flying in formation can track closely the movement of the other aircraft without straying out of formation and, more importantly, avoiding a collision with other aircraft. As a result, covert, tactical, night-flying operations can be carried out in a much safer and more efficient manner than these operations are currently being conducted.

In operation, a pilot or other maintenance personnel crack the chemiluminescent light sources just prior to taking off. Then, the pilots insert the activated lights into the housings of the position lights and secure the closure members. These are all the steps necessary to use the system. During flight, the light source will remain illuminated for several hours, and typically longer than the flying time for the aircraft. Of course, a supply of chemiluminescent light sources will have to be kept for ready access to replacement light containers.

The housing, bracket, and gusset of the position lights are machined from high-grade aluminum, coated with FAR approved paint, and are virtually maintenance free. They are simply secured to the aircraft by means of clamps or other suitable fasteners. Once secured to the aircraft, inserting and removing the light containers are the only required steps for use of the system.

It should be noted that the anti-collision position lights of the present invention can be used on any aircraft that requires low-level illumination during low-visibility flying conditions. Thus, it is possible for the present invention to be used on fixed-wing aircraft as well as on civilian helicopters.

In addition, the position lights of the present invention eliminate the requirement of landing the aircraft when the tape-over method is used by the military during training missions. Military aircraft can take off with the illumination system of the present invention and fly through civilian airspace, if necessary, in conformance with FAA regulations with their navigational lights on. Then, when the aircraft fly into military airspace to begin their training missions, the navigational lights can be turned off and the aircraft are ready to commence training flights. No time-consuming additional landings are required.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently-described and illustrated embodiment is nonlimitive and is for illustration only. Instead, my patent protection is to be limited only by the following claim or claims interpreted according to accepted doctrines of claim interpretation, including the doctrine of equivalents and reversal of parts.

What is claimed is:

1. A system for illuminating parts of an aircraft, comprising:
   at least three low-intensity position lights mounted on the aircraft, with two of the position lights mounted in a forward location and spaced laterally from a longitudinal centerline of the aircraft and a third position light mounted in an aft location centrally positioned on the longitudinal centerline of the aircraft, for providing a triangular light formation to indicate the position of the aircraft during tactical covert operations, each low-intensity position light including:
   a chemiluminescent light source including a chemiluminescent substance and a translucent container for encapsulating the chemiluminescent substance,
   a housing for holding the chemiluminescent light source, the housing including a chamber for receiving the chemiluminescent light source, an opening for inserting and removing the chemiluminescent light source into and from the chamber, and at least one side opening for exposing the translucent container to the exterior of the housing, and
   a bracket portion for securing the housing to the aircraft.

2. The system of claim 1, wherein the housing includes a closure member for closing off the opening of the chamber upon insertion of the chemiluminescent light source into the chamber, and a lock mechanism for securing the closure member in its closed position.

3. The system of claim 1, wherein the chemiluminescent substance produces an infrared light.

4. The system of claim 1, wherein the chemiluminescent substance produces an ultraviolet light.

5. The system of claim 1, wherein the bracket and the chamber are angled with respect to each other in order to expose the side opening of the housing to the rear of the aircraft upon mounting the bracket to a horizontal surface of the aircraft.

6. The system of claim 1, wherein the side opening of the housing includes a portion exposing the translucent container to the port side of the aircraft, a portion exposing the translucent container to the starboard side of the aircraft, and a portion exposing the translucent container to the rear of the aircraft.

7. The system of claim 1, wherein the bracket includes a slot for receiving a clamp to secure the position light to the aircraft.

8. The system of claim 1, wherein the chamber of each housing includes a compression spring opposite the end opening of the housing.

9. The system of claim 1, wherein the aircraft on which the position lights are mounted is a helicopter.

10. The system of claim 9, wherein the two position lights mounted in a forward location are mounted on the struts supporting the fuselage skids of the helicopter and the position light mounted in an aft location is mounted on the tail assembly of the helicopter.

11. The system of claim 10, wherein the bracket of each low-intensity light is concave to conform to a tubular structure on the helicopter.

12. The system of claim 1, wherein the bracket portion is shaped to conform with the aircraft structure to which the position light is to be mounted.

* * * * *